(12) United States Patent
Wong

(10) Patent No.: US 7,866,927 B1
(45) Date of Patent: Jan. 11, 2011

(54) POLE INSTALLATION SYSTEM

(76) Inventor: Thomas K. Wong, 795 Panorama Dr., San Francisco, CA (US) 94131

(*) Notice: Subject to any disclaimer, the term of this patent is extended or adjusted under 35 U.S.C. 154(b) by 337 days.

(21) Appl. No.: 12/152,319

(22) Filed: May 13, 2008

(51) Int. Cl.
*A01G 23/02* (2006.01)
*B66C 23/62* (2006.01)

(52) U.S. Cl. .......................... 411/23; 52/116

(58) Field of Classification Search ............... 212/299; 248/159, 357; 403/192, 262; 414/23; 52/115–117, 52/120, 122.1, 123.1, 169.9, 298, 848
See application file for complete search history.

(56) References Cited

U.S. PATENT DOCUMENTS

| | | | |
|---|---|---|---|
| 639,286 A | 12/1899 | Prevost | |
| 2,792,948 A | 5/1957 | De Shano | |
| 2,880,827 A * | 4/1959 | Gilmore | 52/120 |
| 2,886,187 A * | 5/1959 | Troche | 212/299 |
| 2,985,261 A * | 5/1961 | Kubesh | 52/120 |
| 3,112,037 A | 11/1963 | Thiermann | |
| 3,144,135 A * | 8/1964 | Brown | 212/299 |
| 3,190,465 A | 6/1965 | Newman | |
| 3,267,627 A | 8/1966 | Hammitt | |
| 3,364,635 A * | 1/1968 | Guggemos | 52/28 |
| 3,680,448 A | 8/1972 | Ballingall et al. | |
| 3,792,680 A | 2/1974 | Allen | |
| 3,820,906 A | 6/1974 | Katt | |
| 3,895,471 A | 7/1975 | Kolb | |
| 4,079,559 A | 3/1978 | Tenbrummeler | |
| 4,114,766 A | 9/1978 | Decker et al. | |
| 4,362,451 A | 12/1982 | Thiermann, Sr. | |
| 4,492,496 A | 1/1985 | Arnold | |
| 4,926,592 A | 5/1990 | Nehls | |
| 5,058,336 A | 10/1991 | Jenvey | |
| 5,476,352 A | 12/1995 | Culbertson et al. | |
| 5,634,759 A | 6/1997 | Jenvey | |
| 5,782,040 A | 7/1998 | McCartan | |
| 5,794,387 A | 8/1998 | Crookham | |
| 5,899,651 A | 5/1999 | Jenvey | |
| 6,191,355 B1 | 2/2001 | Edelstein | |
| 6,216,414 B1 | 4/2001 | Feldberg | |
| 6,264,162 B1 | 7/2001 | Barnes et al. | |
| 6,322,038 B1 | 11/2001 | Ghahremani | |
| 6,390,436 B2 | 5/2002 | Barnes et al. | |
| 6,399,881 B2 | 6/2002 | Edelstein | |
| 6,428,242 B1 | 8/2002 | Ward | |
| 6,709,215 B1 | 3/2004 | Sorensen | |
| 6,851,231 B2 | 2/2005 | Tadros et al. | |
| 6,955,025 B2 | 10/2005 | Dehlsen et al. | |
| 7,267,516 B1 | 9/2007 | Sorensen | |
| 7,275,351 B2 | 10/2007 | Knepp | |
| 2004/0172898 A1 * | 9/2004 | Knepp | 52/299 |

* cited by examiner

*Primary Examiner*—Gregory W Adams
(74) *Attorney, Agent, or Firm*—Thomas R. Lampe

(57) ABSTRACT

A pole installation system includes a pole base and pole member releasably connected to the pole base. A mobile pole caddy is employable to transport the pole member to and from the pole base and to raise or lower the pole member while it is pivotally connected to the pole base to install or disintall the pole member.

14 Claims, 6 Drawing Sheets

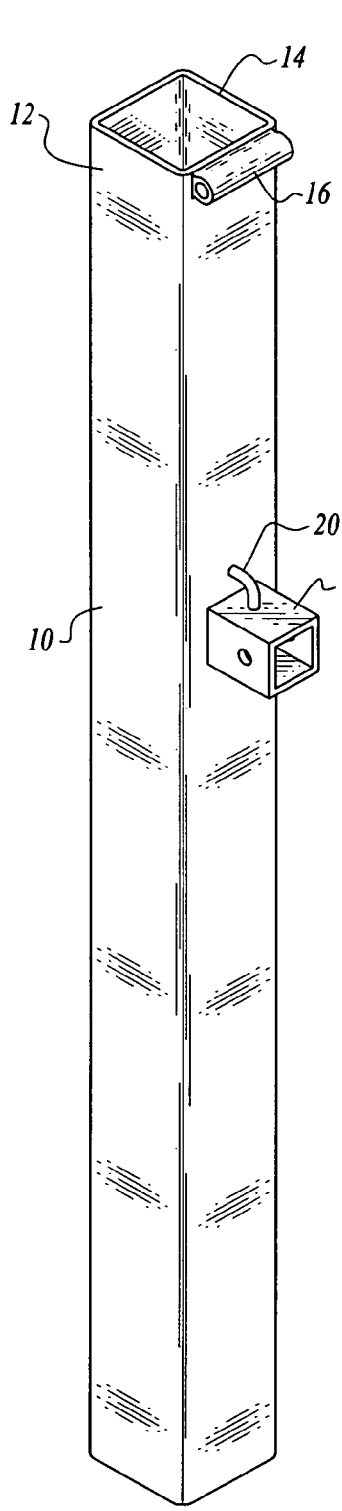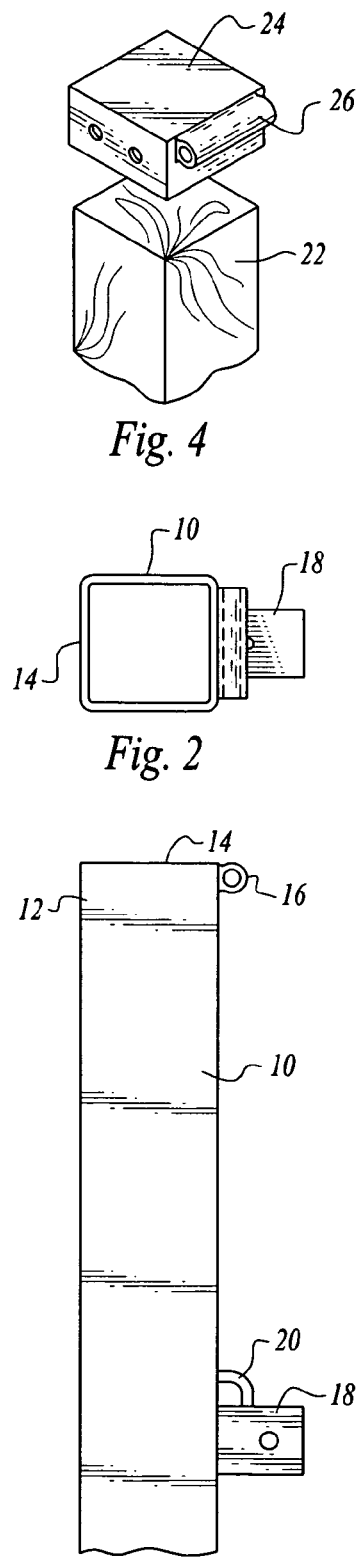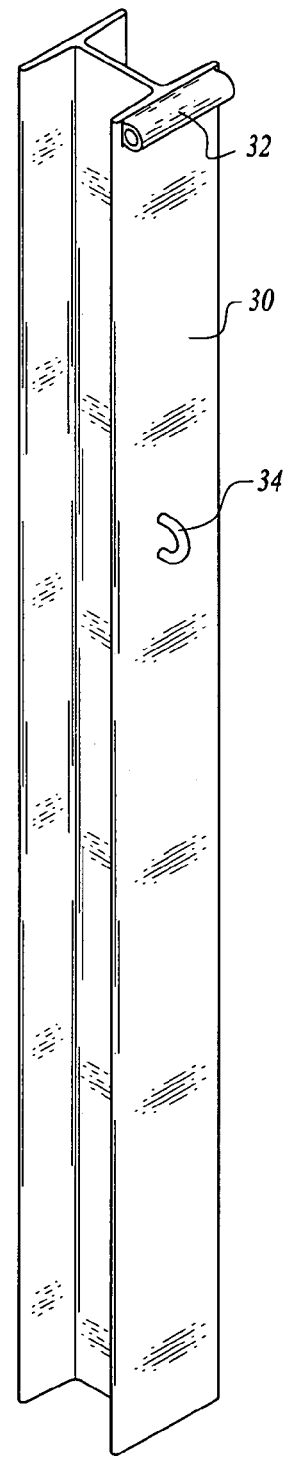
Fig. 1
Fig. 4
Fig. 2
Fig. 3
Fig. 5

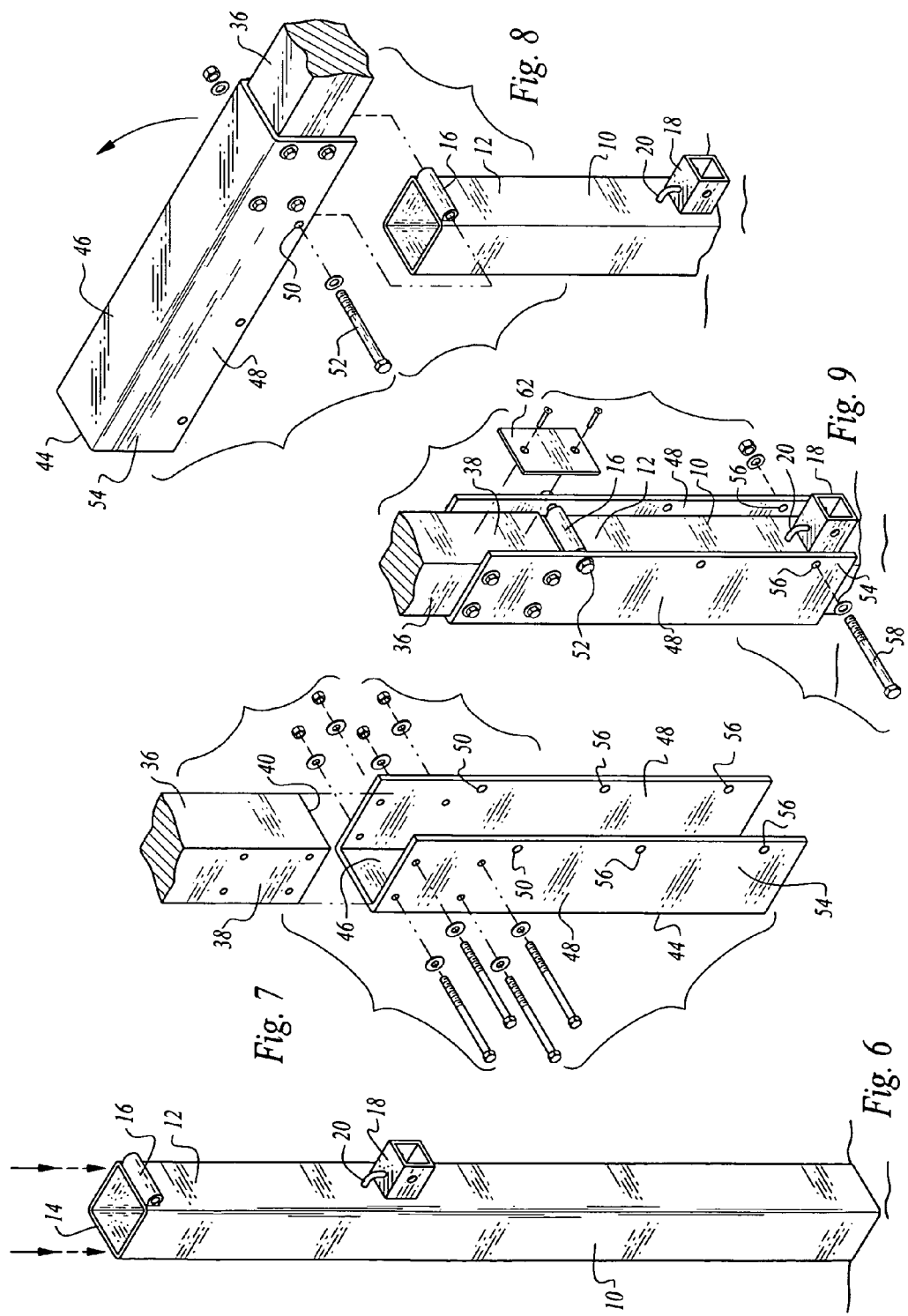

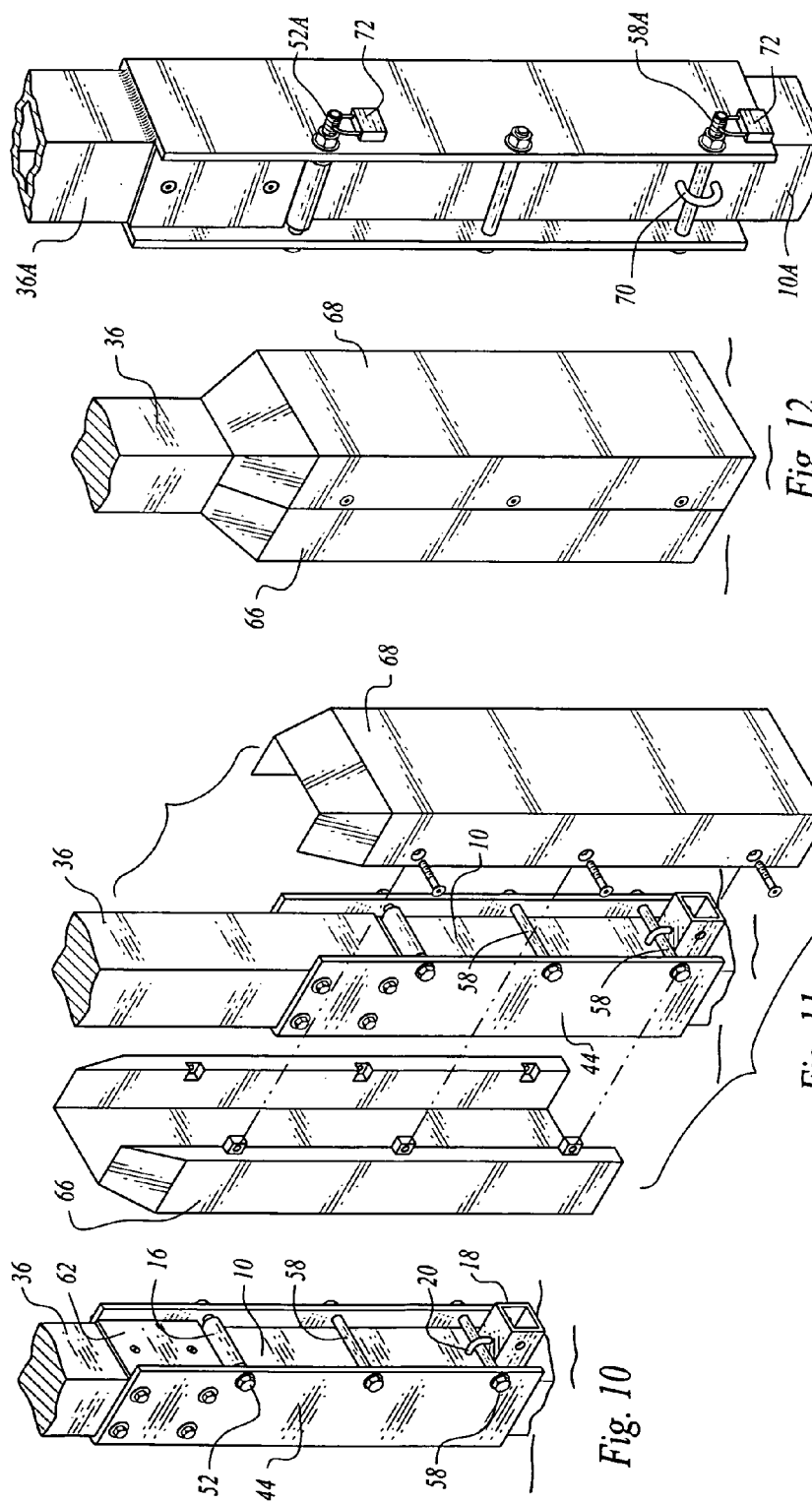

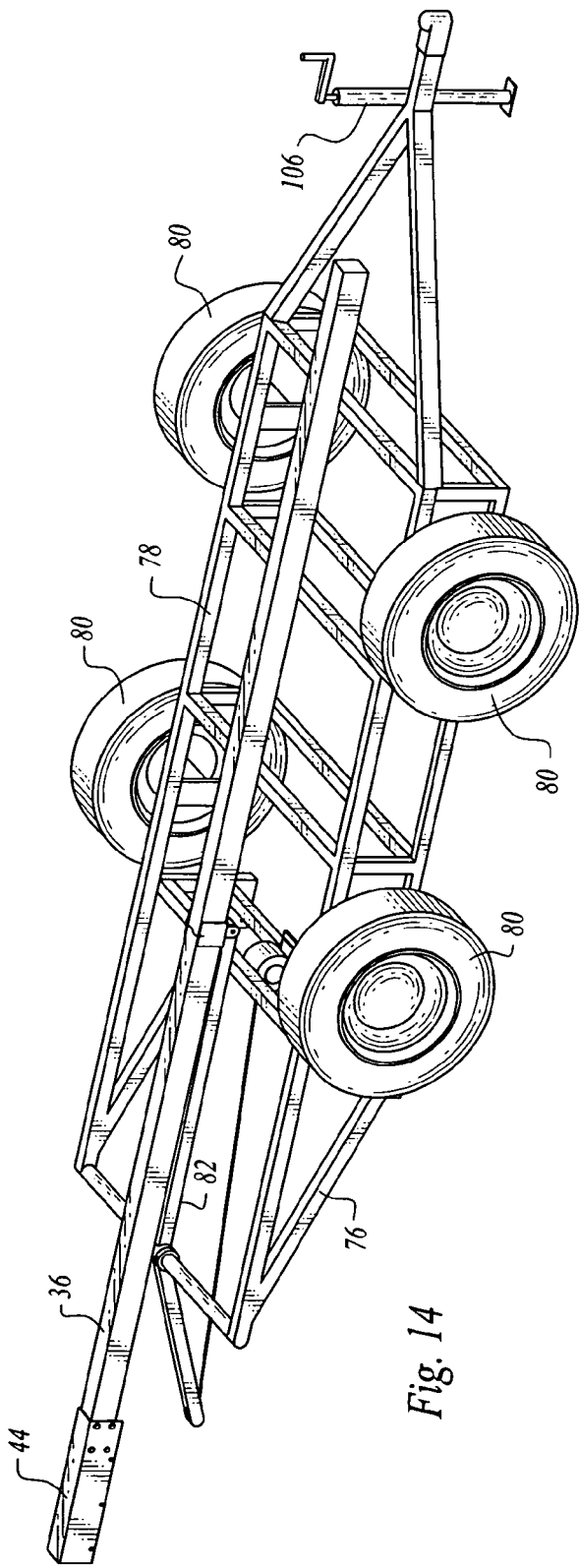
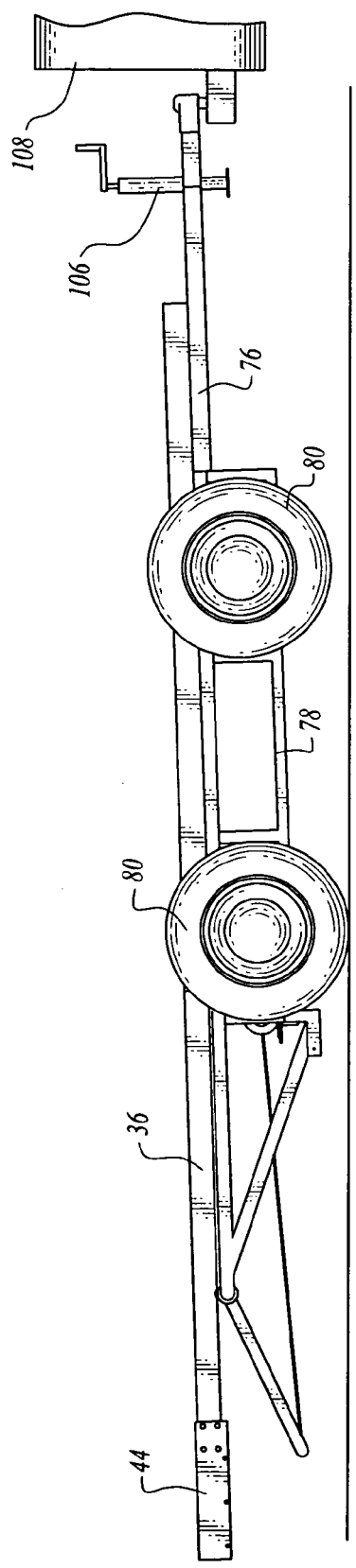
Fig. 14
Fig. 15

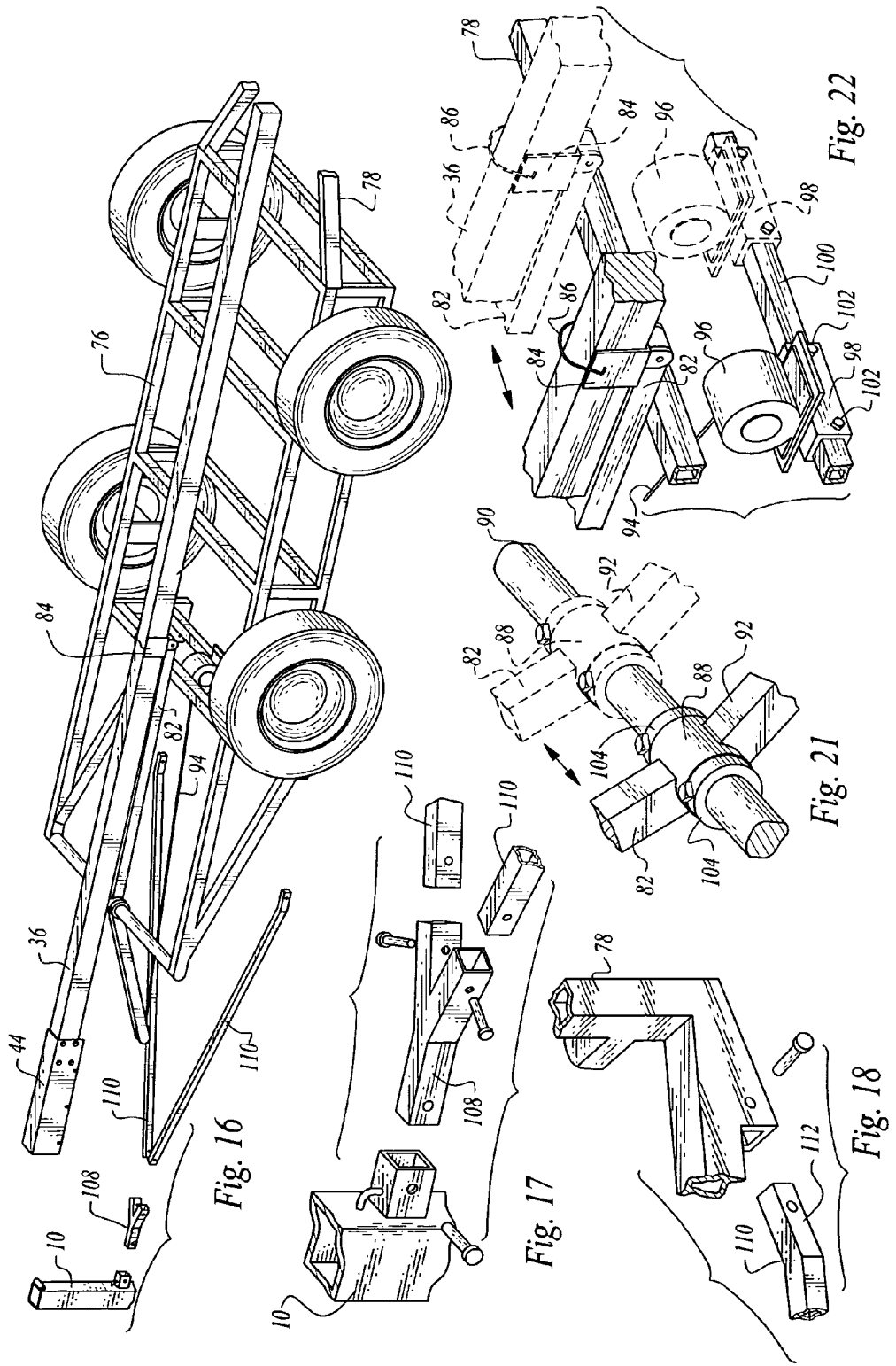

POLE INSTALLATION SYSTEM

TECHNICAL FIELD

This invention relates to a pole installation system which is applicable when installing poles of various types. The system incorporates a pole of unique character incorporating a separable pole base and pole member as well as a mobile pole caddy for either transporting the pole member to the pole base and installing the pole member on the pole base or transporting the pole member away from the pole base when removed therefrom.

BACKGROUND OF THE INVENTION

There are many types of poles for a wide range of applications, such as streetlights, fence posts, flagpoles, utility poles and sign poles. The term poles as used herein encompasses both relatively short poles, commonly called posts, as well as poles of greater length.

The current methods of pole installation can be grouped into 3 categories. (1) The simplest category involves driving a pole into the ground with a post driver; it is commonly used for installing short sign poles and fence poles. (2) The second category requires digging a hole into the ground first, the pole then being placed into the hole, and native soil compacted around the pole. Instead of using compacted soil, expandable foam, cement or concrete are also commonly used to secure the pole inside the hole. This method is used in many applications such as fence posts, flagpoles, utility poles and tall sign poles. The installation cost is higher than the first approach, but it is currently the cheapest way to install tall poles. (3) The third approach is to build a reinforced concrete foundation with anchor bolts or other fasteners protruding from the top of the concrete foundation for pole attachment. A hole in the ground is still needed to embed the concrete foundation. With this approach, the pole is set on top of the foundation. Tall poles or poles requiring strong base connection typically use this third approach; examples include tall street lamps, utility poles and flagpoles. This is the costliest of the three methods, but is also the strongest for heavy loading. When electrical wires are required, such as for street lamps, conduit is embedded into the concrete foundation or introduced underground from a side of the pole. Once wires are pulled inside the base of the pole, wire connection is done through a "hand hole" at the bottom of the pole. These prior art approaches have been practiced for many years and are effective in many ways. However, they do have limitations and shortcomings as listed below:

The installation practice of Category 1 is simple, efficient and low cost. A major drawback is the limited length of the pole it can handle. It is difficult and not safe to drive a tall pole into the ground, and some poles such as flagpoles are not designed for driving.

The installation approach of Category 2 can handle tall poles of various types. The installation cost is higher than Category 1. Except for very small poles, it requires at least two people and often includes auger and lifting equipment to dig a deep hole and put the pole in place. Further, removing the pole will involve significant efforts and costs.

The approach of Category 3, in addition to the cost and time of a reinforced foundation, involves a second trip to install the pole after the concrete is set. In most cases, it requires at least a two-man crew, auger and lifting equipment. Pole removal is also very costly.

To simplify installation, and make pole servicing easier, it is known to employ a hinged base to allow easier raising and lowering of a pole. This is a variation of the Category 3 approach. U.S. Pat. Nos. 4,079,559 and 6,216,414 disclose two examples. In these examples, the pole connections to the base are very strong. U.S. Pat. No. 5,058,336 uses a cumbersome hydraulic ram to raise and lower a pole, and its base hinge connection is weak. Weaker materials such as wood will not work well for the pole base. Moreover, these prior art installations suffer the same problems as mentioned above in connection with Category 3.

The prior art installations in general are limited in efficiency and versatility. Many steps and resources are involved during installation. Since at least two people are often required, it is highly inefficient when installing small numbers of poles; driving time alone can be costly. A system allowing only one person installation can yield huge savings for small quantity jobs. Further, as removing poles installed using the prior art approaches is difficult, they are not efficient for temporary applications such as temporary power poles and temporary surveillance camera poles. Electrical wiring installation using the prior art systems is also rather clumsy. Maintenance, such as changing light bulbs, equipment or components thereof can also be challenging, since elevated equipment such as a bucket truck is often necessary. The hinged base poles are better for servicing, but their pole base installations are far from desirable.

The following prior art is believed to be further representative of the current state of the prior at in this field: U.S. Pat. No. 6,955,025, U.S. Pat. No. 7,275,3516, U.S. Pat. No. 5,782,040, U.S. Pat. No. 3,680,448, U.S. Pat. No. 6,390,436, U.S. Pat. No. 6,264,162, U.S. Pat. No. 3,267,627, U.S. Pat. No. 3,820,906, U.S. Pat. No. 6,428,242, U.S. Pat. No. 3,792,980, U.S. Pat. No. 4,926,592, U.S. Pat. No. 6,851,231, U.S. Pat. No. 6,399,881, U.S. Pat. No. 6,191,355, U.S. Pat. No. 3,895,471, U.S. Pat. No. 7,267,516, U.S. Pat. No. 6,709,215, U.S. Pat. No. 5,899,651, U.S. Pat. No. 5,634,759, U.S. Pat. No. 5,794,378, U.S. Pat. No. 6,322,038, U.S. Pat. No. 3,112,037, U.S. Pat. No. 639,286, U.S. Pat. No. 5,476,352, U.S. Pat. No. 4,362,451, U.S. Pat. No. 4,492,496, U.S. Pat. No. 3,190,465, U.S. Pat. No. 4,114,766 and U.S. Pat. No. 2,792,948.

DISCLOSURE OF INVENTION

The present invention provides a highly efficient approach for installing both large and small quantities of poles. It is equally efficient for setting and removing poles intended for temporary or permanent installations. It is also efficient with regard to equipment maintenance, since no lift is needed to access the pole-mounted equipment. Per pole installation efficiency is extremely high. The pole installation system of this invention has a greater capability to add poles after the fact, such as placing a new pole on existing concrete or asphalt surfaces. It is also less costly when accomplishing this function.

The pole of the installation can take on heavy wind load and equipment load. Especially with regard to medium and tall poles, the approach of the present invention is effective and cost efficient for a wide variety of pole types and loading conditions.

The pole installation system incorporates a pole including a pole base fixed in place, extending upwardly from the ground and having a pole base upper portion with a pole base distal end. The pole also includes an elongated pole member having a pole member lower portion with a pole member end.

Connector structure is provided for releasably connecting the pole member lower end to the pole base upper portion. The pole member is selectively pivotally movable relative to the pole base when releasably connected thereto by the connector structure between a first position wherein the pole member extends vertically upwardly from the pole base and a second position wherein the pole member extends laterally outwardly from the pole base.

Lock structure is provided for selectively locking the pole member lower portion and the pole member base against relative movement when the pole member is in the first position.

The pole installation system additionally includes a mobile pole caddy selectively movable toward or away from the pole base and utilized to either transport the pole member to the pole base and position the pole member lower portion closely adjacent to the pole base upper portion prior to releasable connection therebetween or transport the pole member away from the pole base after the pole member lower portion has been disconnected from the pole base upper portion.

The pole caddy includes a support for supporting the pole member in a generally horizontal orientation during transport and mover structure connected to the support for moving the support and for moving the pole member between the first and second positions after the pole member is releasably connected to the pole base.

Other features, advantages and objects of the present invention will become apparent with reference to the following description and accompanying drawings.

BRIEF DESCRIPTION OF DRAWINGS

FIG. 1 is a perspective view of a first embodiment of pole base constructed in accordance with the teachings of the present invention;

FIG. 2 is a top, plan view of the pole base of FIG. 1;

FIG. 3 is a side, elevational view illustrating an upper portion of the pole base of FIG. 1;

FIG. 4 is a perspective view illustrating selected portions of a second embodiment of pole base;

FIG. 5 is a view similar to FIG. 1, but illustrating a third embodiment of pole base;

FIG. 6 is a perspective, diagrammatic view of the pole base first embodiment being driven into the ground;

FIG. 7 is an exploded, perspective view illustrating a lower portion of a wooden pole member prior to attachment thereto of a rigid channel member;

FIG. 8 is a perspective, exploded view illustrating the rigid channel member and attached pole member portion prior to releasable connection thereof to the first embodiment of pole base, the latter having been driven into the ground;

FIG. 9 is an exploded, perspective view showing the rigid channel member partially surrounding the pole base and with a pivot bolt installed and prior to installation of a lock bolt;

FIG. 10 is a perspective view showing the channel member fully installed on the pole base with the wooden pole member projecting upwardly from the pole base;

FIG. 11 shows the pole base-pole member arrangement of FIG. 10 prior to installation of cover members;

FIG. 12 is a perspective view showing the cover members in place to form a cover and secured in position;

FIG. 13 is a perspective view illustrating an alternative embodiment of the invention wherein a channel member is welded to a metal pole member and wherein padlocks are connected to ends of a pivot bolt and lock bolt extending through legs of the channel member;

FIG. 14 is a perspective view of a mobile pole caddy constructed in accordance with the teachings of the present invention supporting a pole member;

FIG. 15 is a side, elevational view of the mobile pole caddy and elongated pole member, the mobile pole caddy being connected to a truck and the mobile pole caddy and pole member being tilted, one set of wheels of the mobile pole caddy being lifted off the ground;

FIG. 16 is a perspective view of the mobile pole caddy and elongated pole member supported thereby along with components of connector brace structure which will be attached to the mobile pole caddy and connected to the pole base to prevent movement of the mobile pole caddy toward or away from the pole base;

FIG. 17 is an enlarged, exploded, perspective view illustrating selected portions of the connector brace structure prior to connection to the pole base;

FIG. 18 is an enlarged, perspective view illustrating an end portion of the connector brace structure prior to releasable connection to the frame of the mobile pole caddy;

FIG. 21 is an enlarged, perspective view illustrating a portion of the mobile caddy frame with portions of the elongated arm and attached lever arm mounted on a rotatable hub, solid and dash line depictions showing the hub and arms in alternative positions;

FIG. 22 is an enlarged, perspective view illustrating a portion of the wooden pole member in position on a holder at the distal end of the elongated support member and also a winch and cable utilized to raise the elongated support and pole member held thereby, the winch, elongated support and pole member portion being shown in alternative positions by solid and dash lines.

MODES FOR CARRYING OUT THE INVENTION

Figure 19:
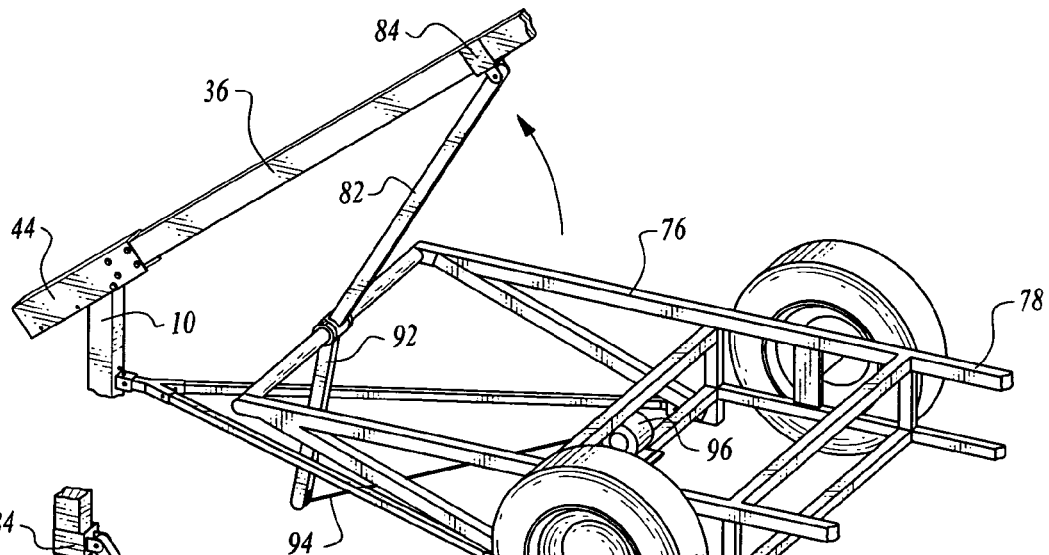
FIG. 19 is a perspective view illustrating a portion of the mobile pole caddy attached to the pole base by the connector brace structure and in the process of moving an elongated support arm of the caddy upwardly to lift the pole member.

FIGS. 1-3, 6, 8-11, 16, 17, 19 and 20 illustrate a pole base constructed in accordance with the teachings of the present invention. In this embodiment, the pole base 10 has a rectangular shape, more particularly the shape of a hollow square tube. The pole base is preferably formed of steel and is driven into the ground by a post driver or other suitable means. FIG. 6 illustrates by means of arrows the pole base 10 being driven into the ground. FIG. 8 and other figures show the pole base 10 fully driven into the ground.

The pole base has a pole base upper portion 12 with a pole base distal end 14. A hinge member in the form of an open-ended, horizontally disposed hollow sleeve 16 is attached to the pole base upper portion as by welding. A pole caddy attachment connector 18 is attached to the square tube portion of the pole base by welding or the like. As will be seen below, this structural feature allows for interconnection between the pole base and a mobile pole caddy. Furthermore, the pole caddy attachment connector 18 acts as a marker for halting the driving operation when driving the pole base into the ground. Positioned above connector 18 and fixedly attached to the hollow square tube and the connector 18 is a rigid security loop 20 defining an opening.

FIG. 4 shows an alternative embodiment of pole base which may be in the form of a wood post 22 having a metal cap 24 screwed or otherwise secured in place on the top of the wood post to hold up under driving. A hinge member sleeve 26 similar to hinge member sleeve 16 is affixed to the metal cap.

FIG. 5 shows a third embodiment of pole base which is in the form of an "H" shaped column 30. Here too a sleeve 32 is utilized. In this embodiment, no caddy attachment connector is utilized. A stand-alone security loop 34 is provided.

A wide range of materials can be used for the pole base such as wood and steel as long as they meet two requirements: (a) strong enough to withstand the post driving force as well as the bending moment from the wind load and equipment weight applied to the pole, and (b) corrosion resistance. Redwood, cedar, pressure treated douglas fir, and plastic lumber are some good examples of solid post base materials. Galvanized or powder coated steels are good examples of post bases made from hollow square tube or H-shape column.

As an example, a post base can be 5'6" long, with 4' driven into ground and 1'6" remaining above ground. The length, size, and the depth into the ground can range from small to large depending on the application, force load, and soil conditions. For taller poles and heavy loading, the pole base should be longer and larger in size. A surveillance camera pole with a moderate size solar panel may require a pole base to be embedded 7' into the ground, by way of example.

The hinge pipes or sleeves, such as sleeves 16, 26 and 32, must be lower than the top of the pole base so that they will not be damaged by the driving process. The width of the hinge must be narrower than the width of the pole base on both sides for reasons discussed below.

The pole base can be driven into ground via a number of means, for example, using a sledgehammer by hand, a jackhammer with an adapter for post driving, or a regular post driver. Appropriate jackhammer adapter or post driver chuck adapters could be used to drive the pole base of a particular shape and size. A post driver can be a simple manual type, pneumatic or hydraulic. For larger pole bases and harder soil conditions, more powerful post drivers may be necessary. For most small to medium size pole bases, one-man, hand-held post drivers or jackhammer with adapters can be used. For large pole bases, post drivers mounted on truck or other platforms may be used. Since the pole base is relatively short and light, installing it can be a single person operation even with vehicle mounted post drivers, thus yielding huge labor efficiency as compared to other pole installation methods as discussed above, which often require more than one person plus lifting equipment (and multiple trips for concrete base).

It is very important that the pole base be checked for good vertical alignment from all directions during the driving process, as adjustment can be difficult after a base is deeply driven into the ground. A simple tool such as a level placed against the sides of the pole base is an effective means to achieve this goal. For normal or soft soil, driving solid post is relatively easy. For harder ground conditions, steel hollow tube, or H column can be more appropriate as the small cross sectional areas of these shapes can increase driving contact pressure. Further, for permanent or strong load conditions, metal pole base such as corrosion protected steel is a good choice. Due to the relative ease of driving pole bases into the ground, one can easily see that this invention can be highly efficient for both small and large numbers of pole installations.

For poles with light equipment load, which can be lifted and lowered by hand safely, the pole bases as shown, but not incorporating the pole caddy attachment connector, may be adequate. For poles that are heavy or with large equipment load, an innovative mobile pole caddy can be used with the pole of this invention without the need for a crane. The mobile pole caddy will be discussed below.

The pole also includes an upper elongated pole member 36 which in the first embodiment is made of wood. The pole member or shaft can be made in a variety of shapes or materials. In addition to being formed as a solid wood post, a square or round tube made of aluminum or steel may be used, for example. A wooden pole member has the advantage of reduced cost. An example of this type of application is a temporary utility pole, where the point of failure is often at the pole base or the pole tilts for lack of depth of embedment. The strong steel pole base allows the use of a smaller pole member without the problem of the pole snapping at the base, where the bending moment is highest. The pole member 36 has a pole member lower portion 38 with a pole member end 40.

Connector structure is provided for releasably connecting the pole member lower portion to the pole base upper portion 12, and the pole member is selectively pivotally movable relative to the pole base when releasably connected thereto by the connector structure, the pole member movable between a first position wherein the pole member extends vertically upwardly from the pole base and a second position wherein the pole member extends laterally outwardly from the pole base.

More particularly, the connector structure is a hinge including two hinge members and a hinge member connector releasably interconnecting the two hinge members to allow pivotal movement therebetween. One of the hinge members is attached to the pole base upper portion below the distal end 14. More particularly, in the present embodiment, the hinge member attached to the pole base upper portion is hinge member sleeve 16, described above.

The hinge member attached to the pole member lower portion 38 is a bracket in the form of a rigid channel member 44 having a U-shaped cross-sectional configuration and including a channel base plate 46 and a pair of channel legs 48 spaced from one another and extending orthogonally from the base plate. The channel legs 48 define pivot bolt receiving holes 50 in registry with one another. These holes 50 receive a pivot bolt 52 extending through sleeve 16 and the bracket.

The base plate 46 and the channel legs 48 are fixedly attached to the pole member 36, for example by threaded bolt and nut fasteners as illustrated in FIG. 7. The channel legs have channel leg segments 54 which define lock bolt receiving holes 56 in registry with one another.

Lock structure is provided for selectively locking the pole member lower portion and the pole base against relative movement when the pole member is in its first or vertical position, as shown for example in FIG. 9. The lock structure includes lock bolts 58 extending through the lock bolt receiving holes alongside the pole base. One of the lock bolts 58 passes through the security loop or lock member 20. Such an arrangement provides additional security to deter against removal of the pole member from the pole base. While in this embodiment two lock bolts 58 are provided, it is to be understood that the number of lock bolts will depend on the requirements of the particular installation.

To approve aesthetics, a cover plate 62 can be provided to hide the joint between the pole member and the pole base. For more permanent installations, a cover may be installed to surround the entire pole base, the channel member 44 and the pole member lower portion 38. Such a cover member is shown in FIGS. 11 and 12 and consists of two cover portions 66, 68 which are brought together and secured in place by screws.

FIG. 13 illustrates another embodiment of the invention wherein the pole base 10A does not incorporate a pole caddy attachment connector, but does incorporate a security lock member or loop 70. In this arrangement, the pivot bolt 52A and the lock bolt 58A passing through security loop 70 have throughbores adjacent the ends thereof which receive shackles of padlocks 72 to provide extra security. This embodiment also differs from those previously described in that the pole member 36A and rigid channel member 44A are welded together, not bolted. Furthermore, pole member 36A is made of tubular metal material instead of being solid.

It will be seen that with the disclosed pole arrangements, the connection between the pole member and pole base is extremely strong and highly structurally efficient. Instead of a simple flanged connection, this invention creates a reinforced joint. Since the channel member is larger and can be constructed of thicker or stronger material than the pole member, the moment of inertia and the modulus of elasticity are significantly larger than the pole member alone, thus increasing the pole system's strength against bending moment and deflection. Further, when a strong pole base is used, the structural strength of the completed system of this invention is greatly superior to the approaches of the prior art. Stiffening a pole base can drastically reduce the movement at the top of the pole. For applications such a surveillance camera pole, the present invention can improve image quality and reduce false motion detection.

Since part of the pole base is above ground, it can be effectively used with an attached device to lift and lower the pole member and its equipment safely and easily. As will be discussed below, the above ground connection also simplifies the use of a pole caddy. The above ground section of the pole base also makes it easy to use a conventional post puller to remove the pole base. Moreover, the relatively short pole base is safe to remove, whereas a tall, heavy pole is not.

With the pole system broken into two parts, removing the relatively short pole base is a simple and easy task. It allows this invention to be effective at temporary installations. Further, the pole base can be easily reused without any damage. If the pole base is an H-shape or hollow tube, there is virtually no hole in the ground to fill; the leftover slots can be easily eliminated without a trace by simply stepping on them.

Using the prior art approaches to install poles that can support high equipment or resist wind load can be a costly and difficult task. In this invention, a longer pole base embedded deeper into the ground can yield huge foundation strength with little incremental resources or efforts.

Not only does this invention allow a one-man operation to install and uninstall heavy pole and equipment, it allows unprecedented safety. The entire process from the shop to a completed system requires minimal handling of heavy and bulky components.

FIGS. 14-23 illustrate a mobile pole caddy 76. The pole caddy is selectively movable toward or away from the pole base and utilized to either transport the pole member to the pole base and position a pole member lower portion closely adjacent to the pole base upper portion prior to releasable engagement therebetween by the pivot bolt 52 or transport the pole member away from the pole base after the pole member lower portion has been disconnected from the pole base upper portion by removal of the pivot bolt and lock bolts.

Pole caddy 76 includes a support for supporting the pole member in a generally horizontal orientation during transport and mover structure connected to the support for moving the support and the pole member between first and second positions after the pole member is releasably connected to the pole base.

Figure 20:
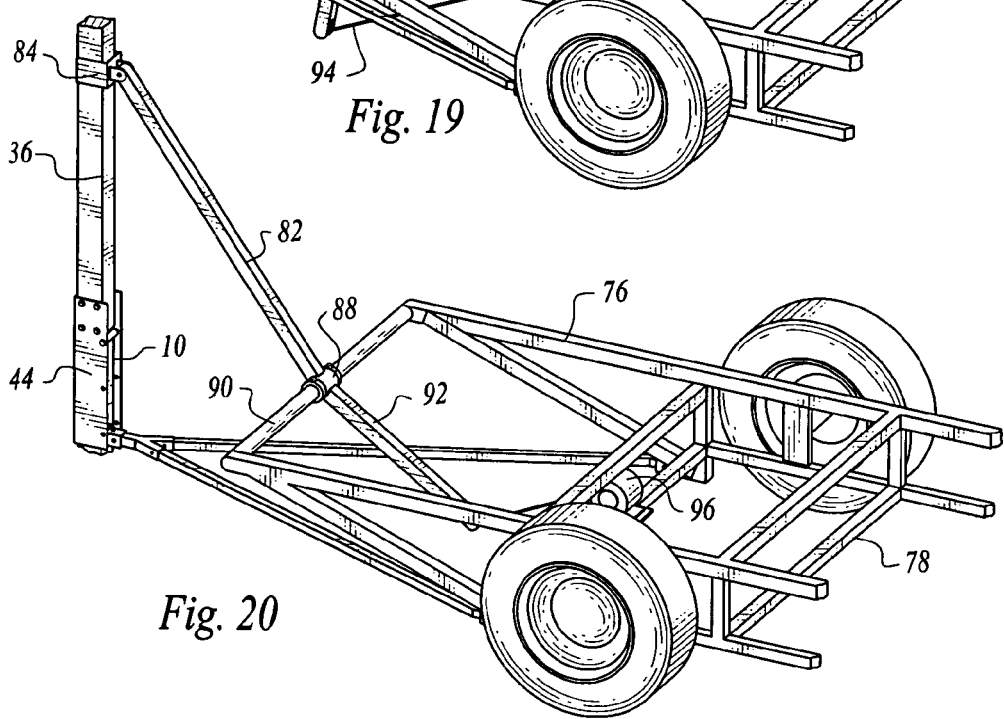
FIG. 20 is a view similar to FIG. 19, but illustrating the pole member in vertical orientation and extending upwardly from the pole base.

The pole caddy includes a frame 78 and four wheels 80 rotatably mounted on the frame. The support includes an elongated arm 82 pivotally mounted on the frame and movable by the mover structure (described below) between a lowered position wherein the elongated arm is generally horizontally disposed, this position illustrated in FIGS. 14-16, and an elevated position wherein the elongated arm 82 projects upwardly. FIG. 19 shows the elongated arm and pole member in the process of being raised, and FIG. 20 shows the pole member 36 vertically positioned over pole base 10. A connection is maintained at all times between the pole member 36 and the distal end of the elongated arm 82 by a U-shaped connector bracket 84 pivotally mounted at the distal end of the elongated arm and receiving the pole member. A retainer strap 86 may be utilized to maintain the pole member in the connector bracket.

The other end of the elongated arm 82 is fixedly attached to a hub 88 which is rotatably and slidably mounted on a round frame member 90. Also affixed to the hub is a shorter lever arm 92. The lever arm 92 is connected at the distal end thereof to a cable 94 leading to a winch 96 which is employed to rotate the hub and elongated arm 82 to raise or lower the pole member. The winch 96 is mounted on a rectangular-shaped sleeve 98 slidably mounted on a rectangular frame member 100.

Figure 23:
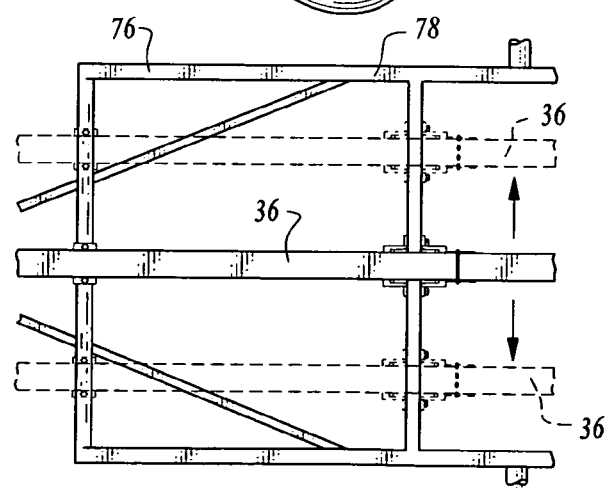
FIG. 23 is a top, plan view illustrating a segment of the frame of the mobile pole caddy and illustrating the elongated support and pole member in three alternative positions.

As can be seen in FIGS. 21 and 22, the winch 96 and the hub 88 may be independently slidably positioned to locate them at any desired position on the frame. This feature is useful, for example, to accommodate other structures, such as solar panels (not shown) already attached to the pole member. Lock bolts 102 associated with sleeve 98 may be utilized to lock the winch at the desired position. The hub and associated elongated arm and lever arm may be locked in the desired location by lock rings 104 associated with lock bolts. FIG. 23 illustrates sideways movement of the elongated arm and the pole member carried thereby to three alternative positions.

The frame 78 has a jack 106 mounted at the tow end thereof. This jack may be utilized to change the degree of inclination of the pole caddy as well as the pole member supported thereby. FIG. 15 shows the tow end of the caddy attached to the hitch of a truck or other vehicle 108.

Referring now to FIGS. 16-18, prior to attaching the pole member 36 to the pole base 10 by channel member 44, brace structure is assembled and attached to the frame 78 and to the pole caddy attachment connector 18. The brace structure is assembled and attached to the frame and pole base to prevent movement of the mobile caddy frame toward or away from the pole base when the pole member is moved between the generally horizontal and vertical orientations. More specifically, the brace structure includes a brace connector 108 which is Y-shaped and two caddy braces 110. Proximal ends 112 of the caddy braces are received in receptacles of the frame 78 as shown in FIG. 18 with respect to one of the braces and secured therein by quick release pins. The other ends of the caddy braces are received in openings formed at the bifurcated end of brace connector 108 and secured therein by lock pins. The other end of the brace connector is inserted into pole caddy attachment connector 18 and secured therein by a lock pin.

The rigid channel member 44 is connected by a pivot bolt passing through sleeve 16 as described above with respect to the pole structure. The winch is then actuated to rotate the lever arm and the elongated arm 82 as depicted in FIG. 19 to raise the pole member and position it in the orientation shown in FIG. 20 wherein the pole member extends vertically upwardly from the base. At that point of the operation, the lock bolts 58 described above are utilized to secure the pole member 36 to the pole base and prevent movement therebetween. It will be appreciated that the pole member may readily be disconnected from the pole base when desired, merely by reversing the procedure.

The invention claimed is:

1. A pole installation system comprising, in combination:

a pole including a pole base fixed in place, extending upwardly from the ground and having a pole base upper portion with a pole base distal end, an elongated pole member having a pole member lower portion with a pole member end, connector structure for releasably connecting said pole member lower portion to said pole base upper portion, and said pole member selectively pivotally movable relative to said pole base when releasably connected thereto by said connector structure between a first position wherein said pole member extends vertically upwardly from said pole base with said pole member end wholly positioned above said pole base distal end and not entering the pole base distal end and a second position wherein said pole member extends laterally outwardly from said pole base, and lock structure for selectively locking said pole member lower portion and said pole base against relative movement when said pole member is in said first position; and a mobile pole caddy selectively movable toward or away from said pole base and utilized to either transport said pole member to said pole base and position said pole member lower portion closely adjacent to said pole base upper portion prior to releasable connection therebetween or transport said pole member away from said pole base after said pole member lower portion has been disconnected from said pole base upper portion, said pole caddy including a support for supporting said pole member in a generally horizontal orientation during transport and mover structure connected to said support for moving said support and for moving said pole member between said first and second positions after said pole member is releasably connected to said pole base, said connector structure comprising a hinge including two hinge members and a hinge member connector releasably interconnecting said two hinge members to allow pivotal movement therebetween, one of said hinge members being attached to a side of said pole base upper portion below said distal end and above said ground, the other of said hinge members attached to said pole member lower portion, the hinge member attached to said pole base upper portion being open-ended and defining a horizontally disposed opening and the hinge member attached to said pole member lower portion comprising a bracket fixedly secured to said pole member lower portion and extending downwardly therefrom, said hinge member connector comprising a pivot bolt, said bracket comprising a rigid channel member having a generally U-shaped cross-sectional configuration and including a channel base plate and a pair of channel legs spaced from one another, extending orthogonally from said base plate and defining pivot bolt receiving holes spaced from one another, spaced from said pole member lower end, and in substantial registry with one another, said pivot bolt passing through said pivot bolt receiving holes and said horizontally disposed opening when said pole member is releasably connected to said pole base, said base plate and said channel legs attached to said pole member, said channel member being elongated and having opposed ends, said pivot bolt receiving holes located between said opposed ends, and said channel member having a channel member segment extending beyond the pole member end, the channel member segment engaging and partially surrounding the pole base when said pole member is in said first position, said channel legs having channel leg segments extending beyond the pole base on opposed sides of the pole base, said channel leg segments defining lock bolt receiving holes in substantial registry with one another, said lock structure for selectively locking said pole member lower portion and said pole base against relative movement when the pole member is in said first position including a lock bolt extending through said lock bolt receiving holes alongside said pole base, said lock bolt and said pivot bolt securing said bracket and said pole member to said pole base.

2. The pole installation system according to claim 1 wherein said mobile pole caddy includes a frame carrying said support and wherein said pole base includes a pole caddy attachment connector for attaching the frame to said pole base to prevent said frame from moving away from said pole base or toward said pole base during operation of said pole member mover structure to move said pole member between said first and second positions.

3. The pole installation system according to claim 2 wherein said pole caddy attachment connector is engageable with the ground during installation of the pole base in the ground.

4. The pole installation system according to claim 1 additionally comprising a cover extending about and covering the pole base upper portion distal end and the pole member end.

5. The pole installation system according to claim 1 wherein said hinge member attached to a side of the pole base upper portion includes a sleeve between said channel legs.

6. The pole installation system according to claim 1 wherein said mobile pole caddy additionally includes:

a frame carrying said support and wheels rotatably mounted on said frame, said support including an elongated arm pivotally mounted on said frame and movable by said mover structure between a lowered position wherein said elongated arm is generally horizontally disposed and an elevated position wherein said elongated arm projects upwardly, connector structure for maintaining a connection between said pole member and said elongated arm as said pole member is moved between said first and second positions by said elongated arm and mover and when said pole member is releasably connected to the pole base and pivots relative thereto.

7. The pole installation system according to claim 6 wherein said mobile pole caddy additionally includes brace structure attachable to said frame and to said pole base and extending therebetween to prevent movement of said frame toward or away from said pole base when said pole member is moved between said first and second positions.

8. The pole installation system according to claim 7 wherein said mobile pole caddy additionally comprises a jack for adjusting the height of said frame relative to said pole base and wherein said brace structure includes a brace connector and caddy braces selectively separable from each other and from said frame.

9. A pole installation system comprising, in combination:

a pole including a pole base fixed in place, extending upwardly from the ground and having a pole base upper portion with a pole base distal end, an elongated pole member having a pole member lower portion with a pole member end, connector structure for releasably connecting said pole member lower portion to said pole base upper portion, and said pole member selectively pivotally movable relative to said pole base when releasably connected thereto by said connector structure between a first position wherein said pole member extends vertically upwardly from said pole base and a second position wherein said pole member extends laterally outwardly from said pole base, and lock structure for selectively locking said pole member lower portion and said pole base against relative movement when said pole member is in said first position; and a mobile pole caddy selectively movable toward or away from said pole base and utilized to either transport said pole member to said pole base and position said pole member lower portion closely adjacent to said pole base upper portion prior to releasable connection therebetween or transport said pole member away from said pole base after said pole member lower portion has been disconnected from said pole base upper portion, said pole caddy including a support for supporting said pole member in a generally horizontal orientation during transport and mover structure connected to said support for moving said support and for moving said pole member between said first and second positions after said pole member is releasably connected to said pole base, said connector structure comprising a hinge including two hinge members and a hinge member connector releasably interconnecting said two hinge members to allow pivotal movement therebetween, one of said hinge members being attached to said pole base upper portion below said distal end, the other of said hinge members attached to said pole member lower portion, the hinge member attached to said pole base upper portion being an open-ended, horizontally disposed hollow sleeve and the hinge member attached to said pole member lower portion comprising a bracket fixedly secured to said pole member lower portion, said hinge member connector comprising a pivot bolt extending through said sleeve and said bracket, said bracket comprising a rigid channel member having a generally U-shaped cross-sectional configuration and including a channel base plate and a pair of channel legs spaced from one another, extending orthogonally from said base plate and defining pivot bolt receiving holes in substantial registry with one another receiving said pivot bolt when said pole member is releasably connected to said pole base, said base plate and said channel legs attached to said pole member, said channel member being elongated with opposed ends, said pivot bolt receiving holes located between said opposed ends, and said channel member having a channel member segment extending beyond the pole member end, the channel member segment engaging and partially surrounding the pole base when said pole member is in said first position, said channel legs having channel leg segments extending beyond the pole base on opposed sides of the pole base, said channel leg segments defining lock bolt receiving holes in substantial registry with one another, said lock structure for selectively locking said pole member lower portion and said pole base against relative movement when the pole member is in said first position including a lock bolt extending through said lock bolt receiving holes alongside said pole base, and said lock structure additionally including a security lock member affixed to said pole base and projecting outwardly therefrom, said security lock member defining an opening for receiving said lock bolt.

10. The pole installation system according to claim 9 wherein at least one of said lock bolt and said pivot bolt defines a throughbore adjacent an end thereof, said lock structure additionally comprising a padlock having a shackle extendible through said throughbore.

11. A pole installation system comprising, in combination:
a pole including a pole base fixed in place, extending upwardly from the ground and having a pole base upper portion with a pole base distal end, an elongated pole member having a pole member lower portion with a pole member end, connector structure for releasably connecting said pole member lower portion to said pole base upper portion, and said pole member selectively pivotally movable relative to said pole base when releasably connected thereto by said connector structure between a first position wherein said pole member extends vertically upwardly from said pole base and a second position wherein said pole member extends laterally outwardly from said pole member lower portion and said pole base against relative movement when said pole member is in said first position; and a mobile pole caddy selectively movable toward or away from said pole base and utilized to either transport said pole member to said pole base and position said pole member lower portion closely adjacent to said pole base upper portion prior to releasable connection therebetween or transport said pole member away from said pole base after said pole member lower portion has been disconnected from said pole base upper portion, said pole caddy including a support for supporting said pole member in a generally horizontal orientation during transport and mover structure connected to said support for moving said support and for moving said pole member between said first and second positions after said pole member is releasably connected to said pole base, said pole caddy including a frame carrying said support and wheels rotatably mounted on said frame, said support including an elongated arm pivotally mounted on said frame and movable by said mover structure between a lowered position wherein said elongated arm is generally horizontally disposed and an elevated position wherein said elongated arm projects upwardly, connector structure for maintaining a connection between said pole member and said elongated arm as said pole member is moved between said first and second positions by said elongated arm and mover structure and when said pole member is releasably connected to the pole base and pivots relative thereto, said mover structure including a winch mounted on said frame and a lever arm attached to said elongated arm, said winch connected to said lever arm by cable and employed to selectively move said lever arm to raise or lower said elongated arm.

12. The pole installation system according to claim 11 wherein said winch and said elongated arm are selectively adjustably movable on said frame.

13. The pole installation system according to claim 12 wherein said mobile pole caddy includes locking stops for selectively locking said elongated arm and said winch at selected alternative positions on said frame.

14. A pole installation system comprising, in combination:
a pole including a pole base fixed in place, extending upwardly from the ground and having a pole base upper portion with a pole base distal end, an elongated pole member having a pole member lower portion with a pole member end, connector structure for releasably pivotally connecting said pole member lower portion to said pole base upper portion, and said pole member selectively pivotally movable relative to said pole base when releasably pivotally connected thereto by said connector structure between a first position wherein said pole member extends vertically upwardly from said pole base and a second position wherein said pole member extends laterally outwardly from said pole base, and lock structure for selectively locking said pole member lower portion and said pole base against relative movement when said pole member is in said first position; and a mobile pole caddy selectively movable toward or away from said pole base and utilized to either transport said pole member to said pole base and position said pole member lower portion closely adjacent to said pole base upper portion prior to releasable connection therebetween or transport said pole member away from said pole base after said pole member lower portion has been disconnected from said pole base upper portion, said pole caddy including a support for supporting said pole member in a generally horizontal orientation during transport and mover structure connected to said support for moving said support and for pivotally moving said pole member relative to said pole base between said first and second positions after said pole member is releasably connected to said pole base, said pole caddy including a frame carrying said support and wheels rotatably mounted on said frame, said support including an elongated arm mounted on said frame and movable by said mover structure between a lowered position wherein said elongated arm generally horizontally disposed and an elevated position wherein said elongated arm projects upwardly, connector structure for maintaining a connection between said pole member and said elongated arm as said pole member is moved between said first and second positions by said elongated arm and mover structure and when said pole member is releasably connected to the pole base and pivots on said pole base, said mover structure mounted on said frame and attached to said elongated arm.

* * * * *